(12) United States Patent
Zicari et al.

(10) Patent No.: US 11,360,984 B1
(45) Date of Patent: Jun. 14, 2022

(54) REAL-TIME AND HISTORICAL FARMING DATA DISTRIBUTION SYSTEM

(71) Applicant: Farmobile LLC, Leawood, KS (US)

(72) Inventors: Sean Zicari, Raymore, MO (US); Adam Mertz, Olathe, KS (US); Rick Talken, Merriam, KS (US); Jason Tatge, Bucyrus, KS (US)

(73) Assignee: Farmobile LLC, Leawood, KS (US)

( * ) Notice: Subject to any disclaimer, the term of this patent is extended or adjusted under 35 U.S.C. 154(b) by 0 days.

(21) Appl. No.: 17/527,944

(22) Filed: Nov. 16, 2021

(51) Int. Cl.
*G06F 16/2455* (2019.01)
*G06F 16/2458* (2019.01)
*G06F 16/248* (2019.01)

(52) U.S. Cl.
CPC ...... *G06F 16/24568* (2019.01); *G06F 16/248* (2019.01); *G06F 16/2477* (2019.01)

(58) Field of Classification Search
CPC .. G06Q 50/02; G06Q 10/063; G06Q 10/0639; G06Q 10/087; G06Q 10/0875; G06Q 30/0201; G06F 16/24568; G06F 16/2477; G06F 16/248
See application file for complete search history.

(56) References Cited

U.S. PATENT DOCUMENTS

| | | | |
|---|---|---|---|
| 2014/0035752 A1* | 2/2014 | Johnson | G06F 3/0484 340/601 |
| 2014/0089045 A1* | 3/2014 | Johnson | G06Q 50/02 705/7.31 |
| 2014/0278731 A1* | 9/2014 | Griffin | G06Q 10/0635 705/7.28 |
| 2015/0106434 A1* | 4/2015 | Fiene | G06Q 10/063 709/203 |
| 2015/0278640 A1* | 10/2015 | Johnson | A01B 79/005 382/110 |
| 2015/0278838 A1* | 10/2015 | Rasa | G06Q 30/0205 705/7.34 |
| 2019/0250882 A1* | 8/2019 | Swansey | G06F 40/289 |
| 2021/0350128 A1* | 11/2021 | O'Brien | G06V 20/188 |

* cited by examiner

*Primary Examiner* — Jorge A Casanova
(74) *Attorney, Agent, or Firm* — Shook, Hardy & Bacon LLP

(57) ABSTRACT

Embodiments of the present disclosure provide for the synchronous distribution real-time and historical farming data to user client devices via shared and personal interface rooms. In some embodiments, multiple users can be connected to a shared interface room corresponding to a data collection device to view real-time and historical farming data simultaneously. The shared interface room can then broadcast farming data to each user whenever real-time farming data is received. Historical farming data can be determined based on a pair of timestamps corresponding to data collection device activity and user activity. When one of the connected users requests to view historical farming data, the historical farming data can be provided to the requesting user via a personal interface room.

17 Claims, 5 Drawing Sheets though the user can access the farming data in this way, the process is time consuming and may provide the user with valuable information only after the time period to make a decision has passed.

REAL-TIME AND HISTORICAL FARMING DATA DISTRIBUTION SYSTEM

BACKGROUND

Advancements in farming machinery have provided users with access to valuable machine and agronomic data ("farming data") that is generated or collected by the farming machinery and other sensors to provide valuable analytical insights into farmland, machine efficiencies, harvest yields, farming methodologies, and more. Users—such as farmers—often benefit from accessing this data as quickly as possible in order to make informed decisions.

However, conventional systems often require a user to manually export farming data from farming machines and sensors, translate the farming data and then present the farming data for analysis and consumption. For example, in some conventional systems, the user must connect a universal serial bus ("USB") drive to a terminal in the farming machine and export the data to the USB drive. As the farming data is often stored in a proprietary format, the user must then upload the data to a proprietary or third-party system to translate the farming data, which can require several hours or days to complete. Although the user can access the farming data in this way, the process is time consuming and may provide the user with valuable information only after the time period to make a decision has passed.

SUMMARY

Embodiments of the present disclosure relate to improved techniques for concurrently streaming real-time farming data (e.g., machine data, agronomic data) and historical farming data for processing and presentation, among other things. Systems and methods are disclosed that provide users streamlined access to real-time farming data and same-day (i.e., already collected) farming data (or datasets) for use in various applications. For example, and in contrast to conventional systems, such as those described above, users can connect to a server of the system to be provided with a real-time and/or a same-day historical view of the farming data via one or more applications. In some embodiments, to provide a user with real-time farming data, farming data can be collected by a data collection device, such as a Farmobile PUC™ device. The farming data can then be imported from the data collection device for immediate use and/or storage in a database through an ingestion process. Subsequently, the farming data can be decoded and provided to the server—which can include a websocket client—that can include one or more interface rooms that are configured to provide a connected user and/or application access to the farming data in real-time. In further embodiments, when a user connects to the server, the system can provide a user with a historical view of the farming data—such as same-day farming data that is generated by the data collection device prior to the user and/or application connecting to the server. This historical view can be provided to the users via an API that connects the server to a system database that includes historical farming data. By way of example, when a user connects to the server, the user can be provided with a real-time stream of farming data. The user can further request to view historical farming data (e.g., farming data that was generated prior to the user connecting to the web client) and, based on this request, the system can concurrently provide the user with some or all of the historical farming data. Accordingly, the user can be provided with a complete and up-to-date view of the farming data for the day.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present systems and methods for streaming real-time farming data are described in detail below with reference to the attached drawing figures, wherein.

DETAILED DESCRIPTION

Figure 1:
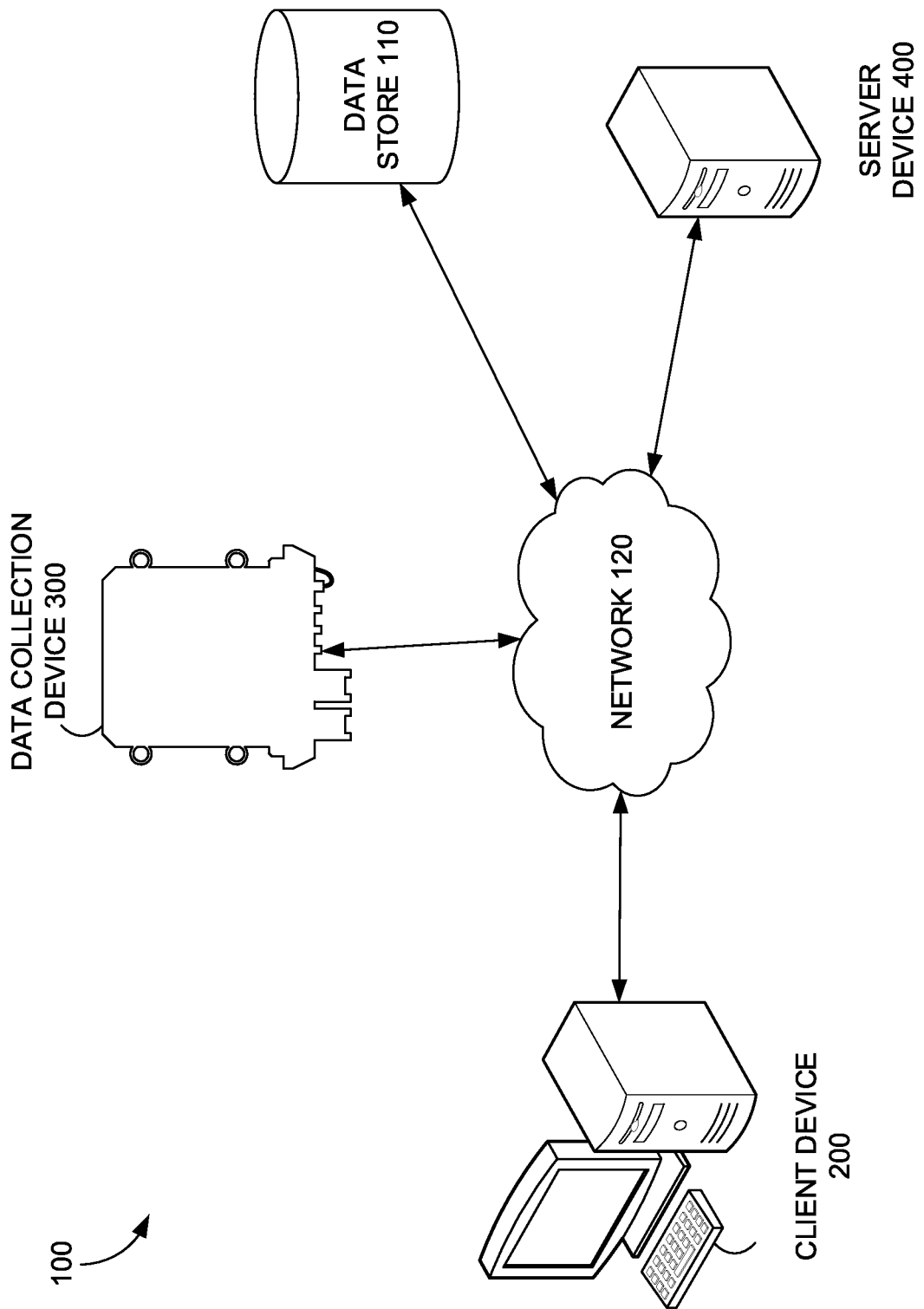
FIG. 1 is a schematic depiction illustrating an exemplary system suitable for use in implementing some embodiments of the present disclosure.

Systems and methods are disclosed related to improved techniques for streaming or otherwise distributing real-time farming data. The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In some embodiments, a user (e.g., a farmer) can employ a data collection device—such as a Farmobile PUC™ device—coupled to farming machinery (e.g., CAN bus) operable by the user. The data collection device can be associated with a user account of the user and can collect raw data generated by the farming machinery, for example. In some aspects, the data collection device can geo-tag the collected raw data based on detected location information, including but not limited to GPS data, cell tower data, Wi-Fi signal data, Ultra-wideband (UWB) data and the like. In some embodiments, the user can employ the data collection device and/or an associated client device to upload, to a server (e.g., via an ingestion process), a set of farming data in real-time that is being generated by the farming machinery and collected by the data collection device. In some other embodiments, the set of collected farming data can be automatically uploaded (e.g., continuously or periodically) from the data collection device to a data storage database anytime during (e.g., in real time) or after operation of the farming machinery. More detail relating to the data collection device and related systems and methods can be found in U.S. Pat. No. 11,126,937, which is assigned or under obligation of assignment to the same entity as this application, the entire contents being herein incorporated by reference.

In accordance with various embodiments, electronic farming data can include, by way of non-limiting example, a set of raw farming data (e.g., sensor collected data, machine or implement data, agronomic data) from the data collection device, an interpreted set of raw farming data (e.g., a dataset generated based on the set of raw farming data), other data (e.g., crop type data, swath width data, seed variety data, nutrient data, soil data, pesticide or other chemical data) associated with the raw farming data, or any combination thereof, among other things.

In some embodiments, the system can provide users access to real-time farming datasets for use in various applications (e.g., partner applications, third-party applications, mobile applications, web applications, desktop applications, and the like). In operation, users can connect to a server of the system to be provided with a real-time view and a historical view of the farming datasets via one or more applications. For example, while connected to the system, a user application can access a stream of real-time farming data that is being fed to the system via a data collection device coupled to a piece of farming machinery. The user application can then interpret the stream of real-time farming data and display the data and/or a visualization of the data to the user. In addition, historical same-day farming data that is generated by the data collection device prior to the user connecting to the server can also be provided to the user application (e.g., all at once) when the user connects to the system. Accordingly, the user can be provided with a complete view of the farming data for the day. Advantageously, the system can provide the user and/or a user application with real-time and/or historical farming data corresponding to farming machinery without requiring data translation or interaction with a proprietor of the data.

Farming data from the data collection device can be provided to the user and/or user application via an ingestion process and/or via an application programming interface ("API") configured to provide historical farming data. The ingestion process can obtain and/or import farming data from the data collection device for immediate use (e.g., for real-time streaming) and/or storage in a system database. The system can decode, encode, format, transform, integrate, or otherwise process raw farming data from the data collection device as part of the ingestion process. In some embodiments, the farming data can be ingested by the system in the form of a binary payload. These binary payloads can be received by the system periodically from the data collection device. Each payload can include a set—or subset—of farming data that corresponds to a period in which the data was collected. For example, a set of farming data can include one or more value(s) or amount(s) of activity output by the farming machinery (i.e., by a computer or central control unit of the farming machinery) at the time of the payload, one or more timestamp(s) corresponding to the time or timeframe of the payload, and/or one or more location(s) (e.g., GPS coordinates) of the data collection device detected at the time of the payload was generated. The system can then decode the binary payload using a decoder library and feed the decoded farming data to one or more system components—such as a system database and/or a message publishing component (e.g., a Redis publisher).

Processed farming data that is provided to the server and/or user in real-time, or near real-time, may be referred to herein as "real-time farming data." In some embodiments, real-time farming data can be provided to one or more real-time interface room(s)—such as a Socket.IO "room"— included at the server of the system. At the real-time interface rooms, the real-time farming data can be provided to and/or accessed by one or more application(s) running on a client device in real-time. Accordingly, the real-time farming data can be accessed by one or more users via respective client devices in real-time.

In operation, a real-time interface room can correspond to a unique identifier associated with a data collection device (e.g., Farmobile PUC ID, serial number, IP address, user account, name, etc.). A user can also be associated with a unique identifier (e.g., username, account number, or other identifier) that can be stored in an identity management system. When a user wishes to view farming data from a data collection device on a piece of farming machinery, the user can request access—such as via a client application—to the farming data of the data collection device. The system can then determine whether the user is authorized to access the farming data of the data collection device. If the user is authorized, the system can grant the user access to the farming data—such as by providing a JSON web token to enable the user to connect to one or more interface rooms associated with the data collection device via an application.

In some embodiments, multiple users can be connected to and/or access a unique real-time interface room corresponding to a unique data collection device to view real-time farming data. A real-time interface room can be referred to herein as a "shared interface room" when multiple users are connected to a single real-time interface room. For example, two users may be interested in the performance of a piece of farming machinery and may request to view the real-time farming data associated with that piece of farming machinery simultaneously. Upon receiving the request from each of the users, the system can connect both users with a single real-time interface room corresponding to the single piece of farming machinery. The real-time interface room can then broadcast farming data received at the real-time interface room to each user and/or user application connected to the room. For example, whenever farming data is received by the real-time interface room, the system can trigger an event in a user application to prompt the user application to process the real-time farming data and provide and/or display the data to the user.

In some embodiments, farming data generated by the data collection device can be stored in the system database. Stored farming data can be cleaned and processed by the system to correct corrupt or inaccurate data within moments (e.g., near real time, within fractions of a second, within a few seconds) of the data being stored. For example, necessary adjustments can be made to the data during the cleaning process based on where an antenna for the data collection device is placed on the farming machinery or based on whether a crop was provided that was not detected by the farming machine.

Stored farming data can be accessed based on a request by an API (e.g., farming data API) to provide historical farming data to the user. As discussed herein, historical farming data can include a set of farming data that is related to or otherwise associated with a set of real-time farming data (e.g., data being collected by a data collection device) being received at any given time. More specifically, as farming data can be grouped together or otherwise stored as a collection for a particular work session (i.e., a particular job being performed), historical farming data can include the farming data that has been collected prior to real-time farming data. In other words, the historical farming data includes the farming data that was received from the data collection device as part of a particular work session, and the real-time farming data includes farming data being received in real-time. In some cases, real-time farming data can be distinguished from historical data based on a time the data collection device establishes communications with the real-time interface room or a server device, as will be described. By way of example, in a particular work session, a farming implement may be performing a particular task (e.g., planting seed) on a particular geographic area. The farming implement can start planting seed from 5 AM to 7 AM, and then temporarily cease operations. The farming implement can continue planting seed from 8 AM-12 PM as part of the same work session. As such, the data that was collected between 5 AM to 7 AM can be stored, cleaned, and/or viewed as historical data, and the data being received starting at 8 AM would be considered real-time data that is associated with the historical work data, because the farming data from each collection period (i.e., 5 AM-7 AM and 8 AM-12 PM) is associated with the same work session.

The request for historical farming data can include a request for any farming data that was collected by a data collection device—and stored at a database—between a pair of timestamps. In some embodiments, the system can automatically generate a pair of timestamps based on when the data collection device began collecting farming data for a current day and when the user connected to the server to view real-time farming data. For example, at 1:00 PM in the afternoon, the user can connect to the server and request historical farming data for a data collection device associated with a specific combine. Upon receiving this request, the system can record a timestamp (e.g., 1:00 PM of the current date) for the request. The system can also determine a timestamp corresponding to a time of the current day when the data collection device associated with the specific combine began collecting data for the current day (e.g., the combine began operation at 6:00 AM on today's date). Based on these two timestamps, the system can generate a request for all farming data between the timestamps (e.g., the historical farming data). The system can then generate and/or access a personal interface room and provide the data to the user via the personal interface room.

The personal interface room can, in some examples, provide all of the historical farming data to only the user who requested the historical farming data. For example, a first user might connect to the server at 9:00 AM and begin receiving real-time farming data via a real-time interface room. A second user might later connect to the server at 12:00 PM and begin receiving real-time farming data via the real-time interface room. The second user can wish to view farming data from earlier in the day and request historical farming data for the day. Based on this request, the system can provide the second user with all of the historical farming data between 12:00 PM and when the data collection device began collecting farming data. This historical farming data can be provided to the user via a personal interface room. In this way, while both the first user and the second user are simultaneously being provided with real-time farming data, only the second user is provided with the requested historical farming data. Advantageously, the first user will not be provided with farming data that the first user has already seen and the second user can be provided with a complete view of the collected farming data for the day.

Turning now to FIG. 1, FIG. 1 is a schematic depiction illustrating an exemplary system 100 in which some embodiments of the present disclosure may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 depicted in FIG. 1 includes a user client device 200 that can communicate with a server device 400 over a network 120, such as the Internet. Each of the user client device 200 and server device 400 can include a computing device, as described in more detail with respect to FIG. 6.

The system 100 preferably includes a network 120 that enables communication between at least one data collection device such as data collection device 300, at least one server device such as server device 400, at least one data store 110, and at least one client device such as client device 200. In various embodiments, the network 120 can include one or more networks including, but not limited to, the Internet, WANs, LANs, PANs, telecommunication networks, wireless networks, wired networks, and the like.

A data collection device associated with a user account of a user (e.g., a farmer), a machine, or the like, such as data collection device 300, can be coupled to at least one raw data generating device, such as a piece of farming machinery by way of example. It is contemplated that the farming machinery can include a set of sensors, computing devices, and/or electronic components that can generate raw data from the farming machinery and/or modules coupled thereto. The raw data (e.g., raw farming data) can include electronic data generated by the set of sensors, computing devices, and/or electronic components coupled to any other set of sensors, computing devices, and/or electronic components, a central control unit (e.g., a computer located within a cab of the farming machinery), or any combination thereof. In some aspects, the generated data is considered raw data, as the data can be collected directly from the set of sensors, computing devices, and/or electronic components, before it is communicated to a computing device for manipulation and/or analysis, among other things. In some embodiments, a sensor capable of collecting raw farming data independently or in conjunction with the data collection device can include any computing device or data collection device that can interface with or couple to one or more control systems (e.g., CAN bus, tractor bus, implement bus) of a farming machine. In some cases, certain pieces of farming machinery can include OBDII connection interfaces, or even Ethernet ports, that facilitate the collection of data from the control systems.

In various embodiments, and as will be described in accordance with FIG. 3, the data collection device 300 can communicate the collected raw data to the server device 400 and/or the data store 110. The server device 400 can include, among other things, at least one computing device, such as the computing device described in accordance with FIG. 6. As described herein, the server device 400 can be one device of a plurality of devices configured to collectively provide farming data to one or more users. In various embodiments, the server device 400 can receive the farming data from the data collection device 300 and/or store to a memory, such as data store 110, the received farming data in association with the user account associated with data collection device 300. In various embodiments, the client device 200 can access and/or be provided with the farming data via the server device 400. For example, the client device 200 can receive real-time farming data from the data collection device via the server device 400 and/or the client device can receive stored historical farming data from the data store 110 via the server device 400.

Figure 2:
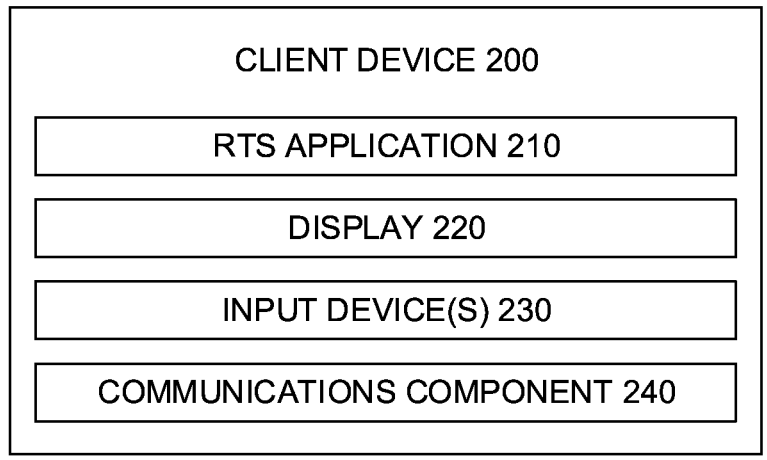
FIG. 2 is a block diagram depicting exemplary client devices in accordance with some embodiments of the present disclosure.

Referring now to FIG. 2, FIG. 2 is a block diagram depicting exemplary client devices 200 in accordance with some embodiments of the present disclosure. The client devices 200 can include a smart phone, a laptop computer, a tablet computer, a desktop computer, a wearable device, a virtual reality (VR) or augmented reality (AR) system, a content streaming device, a smart-home device that can include an intelligent personal assistant, and/or another type of device capable of supporting delivery of farming data messages.

The client devices 200 can include a RTS application 210, a display 220, an input device(s) 230, and/or a communications component 240. Although only a few components and/or features of the client device 200 are illustrated in FIG. 2, this is not intended to be limiting. For example, the client devices 200 can include additional or alternative components, such as those described below with respect to FIG. 6.

The RTS application 210 can be a mobile application, a computer application, a web application, and/or another type of application. The RTS application 210 can include instructions that, when executed by a processor(s), cause the processor(s) to, without limitation, receive input data representative of user inputs to the one or more input devices 230, connect to one or more interface rooms (e.g., real-time interface room 412 and personal interface room 414 of FIG. 4), generate requests for real-time farming data corresponding to a data collection device, generate requests for historical farming data corresponding to a data collection device, and cause display of a representation of real-time and historical farming data via the display 220. The RTS application 210 can be a proprietary application, a third-party application, an open-source application and/or other application. In some embodiments, the RTS application 210 can be used to authenticate, at least in part, a user and authorize the user to view farming data via the RTS application 210.

The display 220 can include any type of display capable of displaying a representation of the farming data (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 220 can include more than one display. In some examples, the display is a touch-screen display, such as a touch-screen of a smart phone, tablet computer, laptop computer, or the like, where the touch-screen is at least one of the input device(s) 230 of the client device 200.

The input device(s) 230 can include any type of devices that are capable of providing user inputs to the RTS application 210. The input device(s) can include a keyboard, a mouse, a touch-screen display, a controller(s), a remote(s), a headset (e.g., sensors of a virtual reality headset, or head mounted display (HMD)), a microphone, and/or other types of input devices.

The communication component 240 can include one or more components and features for communicating across one or more networks, such as the network(s) 120. The communication component 240 can be configured to communicate via any number of network(s) 120, described herein. For example, to communicate in the system 100 of FIG. 1, the client device 200 can use a cellular, Ethernet, or Wi-Fi connection through a router to access the Internet in order to communicate with the server device 400.

Figure 3:
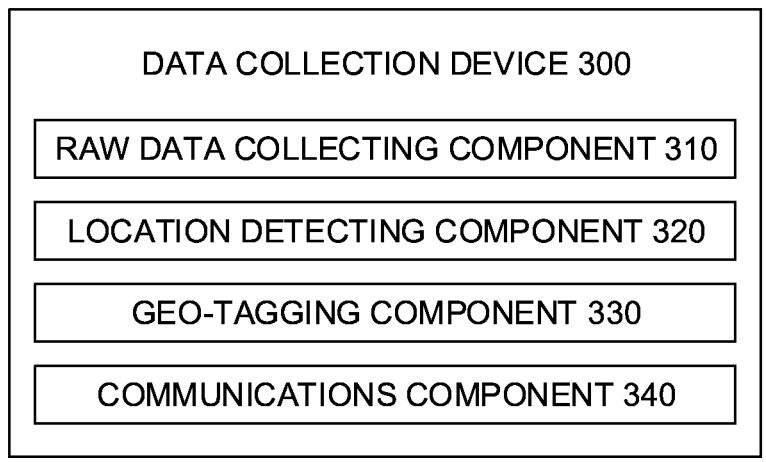
FIG. 3 is a block diagram depicting an exemplary data collection device in accordance with some embodiments of the present disclosure.

Referring now to FIG. 3, FIG. 3 is a block diagram depicting an exemplary data collection device 300 in accordance with some embodiments of the present disclosure. The data collection device 300 can be associated with a unique identifier, such as a hardware ID, serial number, electronic identifier, among other things. In some embodiments, the unique identifier can be encoded into hardware and/or software of the data collection device 300. In some further embodiments, the unique identifier can be associated with a user account and stored in the identity management system 420 of FIG. 4, such that a logical and/or symbolic mapping there between is maintained in a memory of a server, such as server device 400 of FIG. 4.

Figure 6:
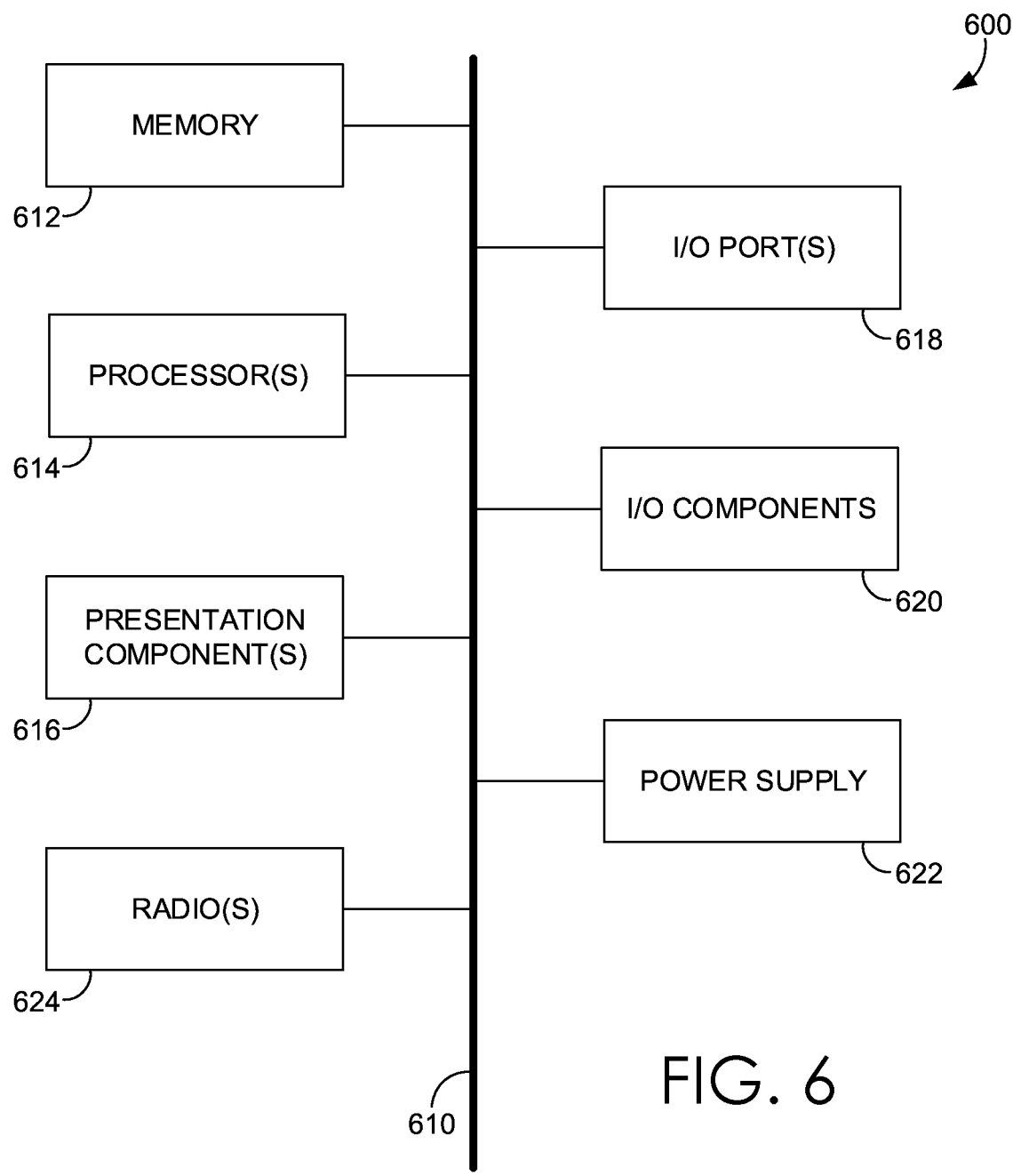
FIG. 6 is a block diagram of an exemplary computing environment suitable for use in implementing some embodiments of the present disclosure.

In accordance with various embodiments, data collection device 300 can include at least one computing device, such as those described herein and in accordance with FIG. 6, and can be coupled to one or more data lines further coupled to sensors, computing devices, electric lines, modules, or other raw data sensing, raw data collecting, and/or raw data generating electronics (herein collectively referred to as "sensors") associated with a piece of farming machinery and/or components coupled thereto. In some embodiments, the data collection device 300 can include at least one input port for receiving and storing the raw data in a memory (e.g., a data storage device), and at least one output port for passing through the received raw data to a computing device associated with the piece of farming machinery. The data collection device 300 can also be coupled to a power source, such as a battery, solar power device, and/or a power source associated with the piece of farming machinery. The data collection device 300 can further include, among other things, a raw data collecting component 310, a location detecting component 320, a geo-tagging component 330, and a communications component 340.

In some embodiments, the raw data collecting component 310 can receive raw data communicated from the sensors to an input port of the data collection device 300. The raw data collecting component 310 can store the received raw data into a cache and/or a memory. The data collection device 300 can further include a location detecting component 320 that can detect a physical location of the data collection device 300. In some embodiments, the location detecting component 320 can include a GPS module for determining GPS coordinates, a Wi-Fi antenna for detecting nearby Wi-Fi signals, a cellular radio for detecting nearby telecommunication towers, a Bluetooth radio for detecting nearby Bluetooth radios, or any other location detecting technology for determining a precise or approximate location of the data collection device 300.

In some embodiments, the data collection device 300 can employ the location detecting component 320 to determine a location of the data collection device 300 in accordance with receiving raw data via the raw data collecting component 310. In other words, at substantially the same time (e.g., under 1 second) of receiving a piece of raw data via raw data collecting component 310, the data collection device 300 can determine the location of data collection device 300 at substantially the same time the piece of raw data is received. In some embodiments, each piece of raw data and each piece of determined location information can be independently timestamped, such that the data collection device 300 can associate a piece of received raw data to a piece of determined location information. In this regard, the data collection device 300 can employ a geo-tagging component 330 to "tag" (e.g., map, embed into, modify) each piece of received raw data with a piece of determined location information. In other words, each piece of received raw data can be tagged with a location of the data collection device 300 determined at a time the piece of raw data was collected by the data collection device 300. In this regard, the received raw data being geo-tagged by the geo-tagging component 330 and stored in a cache or memory of the data collection device 300 can be referenced herein as collected farming data.

In some further embodiments, the data collection device 300 can include a communications component 340, which facilitates the wired and/or wireless communication of the collected farming data to a server, such as server device 400 of FIG. 1, across one or more networks, such as the network 120. In some embodiments, the data collection device 300 can communicate the collected farming data to the server device 400 and/or the data store 110 in real-time, such that the collected farming data is continuously streamed or periodically communicated to the server device 400 and/or the data store 110. In some other embodiments, the data collection device 300 can communicate the collected farming data to the server device 400 and/or the data store 110 when a communications signal (e.g., Wi-Fi signal, Bluetooth signal, cellular signal) is available to the communications component 340. In this regard, the received raw data can continue to be geo-tagged and stored in a memory or cache of the data collection device 300, such that when the communications signal is available, the communications component 340 can establish a signal with the server device 400 and/or the data store 110 and communicate the collected worked data to the server device 400 and/or the data store 110.

In some embodiments, the communications component 340 can communicate the unique identifier associated with the data collection device 300 prior to or in conjunction with any portion of collected farming data communicated to the server device 400 and/or the data store 110. In some other embodiments, the geo-tagging component 330 can include metadata including the associated unique identifier when "tagging" the received raw data. In this way, the server device 400 can determine that the collected farming data being received is associated with the data collection device 300, and can further determine that the collected farming data being received is associated with a user account associated with the data collection device 300.

Figure 4:
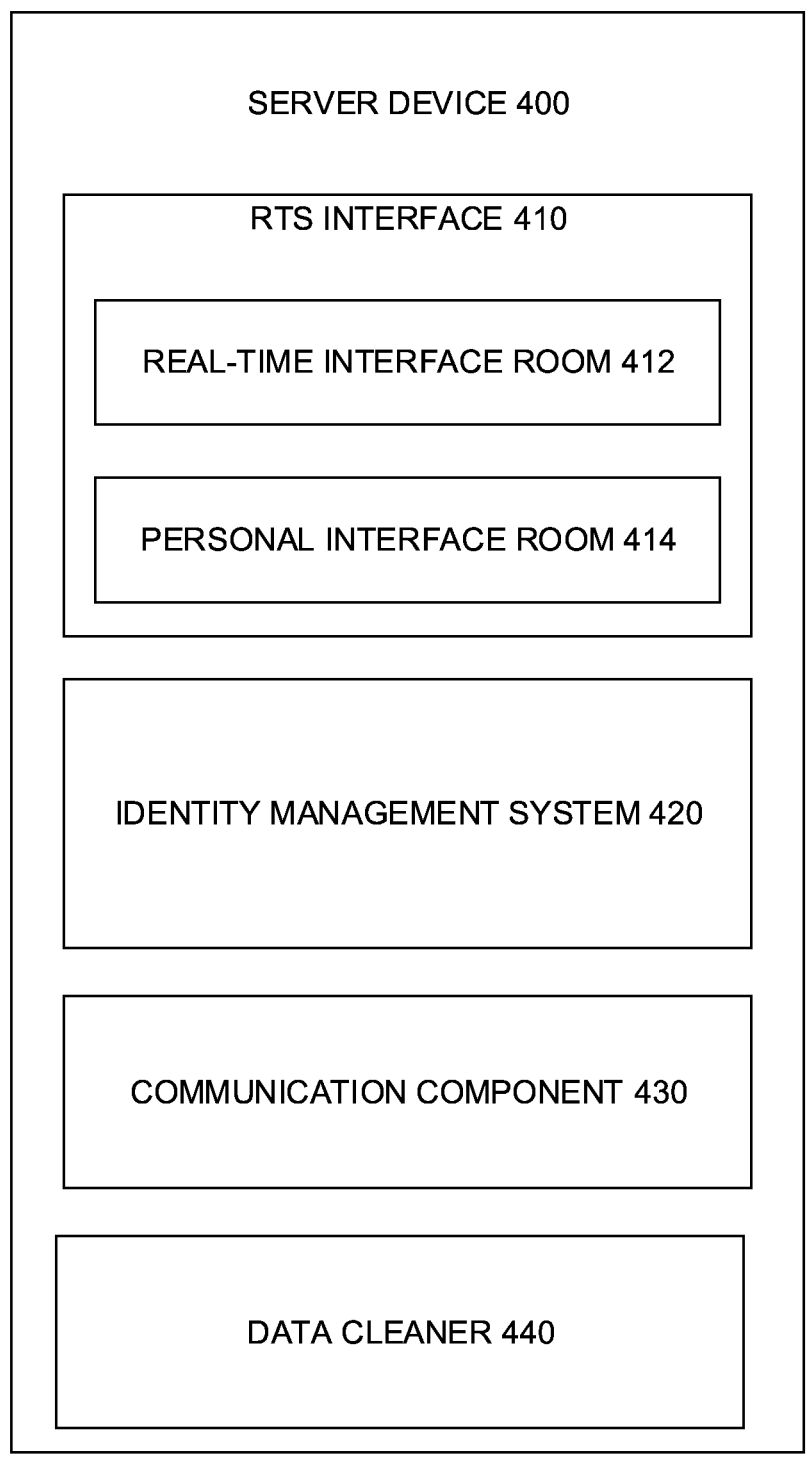
FIG. 4 is a block diagram depicting an exemplary server device in accordance with some embodiments of the present disclosure.

With reference to FIG. 4, FIG. 4 is a block diagram depicting an exemplary server device 400 in accordance with some embodiments of the present disclosure. The server device 400 can include at least one computing device described in accordance with FIG. 6, and can further include a real-time streaming ("RTS") interface 410, an identity management system 420, a communication component 430, and a data cleaner 440. The RTS interface 410 can include a real-time interface room 412 and a personal interface room 414.

In operation, farming data can be communicated to the RTS interface 410 of the server device 400 in real-time or near real-time (e.g., within fractions of second, or within a few seconds). In some embodiments, farming data can be provided to the real-time interface room 412 of the server device 400. At the real-time interface room 412, the farming data can be provided to and/or accessed by the connected client device 200 via the RTS application 210. The real-time interface room 412 can correspond to a unique identifier associated with a data collection device 300. The user can also be associated with a unique identifier (e.g., username, account number, or other identifier) that can be stored in the identity management system 420. When the user wishes to view the farming data from a data collection device 300, the user can request access to the farming data via the RTS application 210. The identity management system 420 can then determine whether the user is authorized to access the farming data. If the user is authorized, the identity management system 420 can grant the user access to the farming data by connecting the user the real-time interface room 412 associated with the data collection device 300. The real-time interface room can be shared with additional authorized users. As such, multiple client devices can be connected to the real-time interface room simultaneously. Accordingly, when farming data is provided to the real-time interface room 412 from the data collection device 300, each connected client device will receive the farming data in real-time.

In some embodiments, the farming data can be stored in the data store 110. Stored farming data can be cleaned and processed by the data cleaner 440 to correct corrupt or inaccurate data within moments (e.g., near real time, within fractions of a second, within a few seconds) of the data being stored in the data store 110. The data cleaner can make necessary adjustments to the farming data during the cleaning process. For example, the farming data can be modified based on placement of an antenna for the data collection device, whether a crop was provided that was not detected by the farming machine, and/or whether any additional error is detected in the farming data.

Farming data that is stored in the data store 110 can be accessed by the RTS interface 410 based on a request to provide historical farming data to the client device 200 via the personal interface room 414. The request for historical farming data can be initiated by the client device 200 and can include a request for any farming data that was collected by a data collection device 300 between a pair of timestamps. In some embodiments, the server device 400 can automatically generate a pair of timestamps based on when the data collection device 300 began collecting farming data for a current day and when the client device 200 connects to the server device 400. Based on these two timestamps, the server device 400 can generate parameters for a request to the data store 110 for all farming data between the timestamps (e.g., the historical farming data). The data store 110 can then provide the historical farming data to the server device 400. The server device can then connect the client device 200 to the personal interface room 414 and provide the historical farming data to the client device 200 via the personal interface room 414. By providing the historical farming data to the client device via the personal interface room, the historical farming data is provided only to the client device 200 and will not be provided to any additional client devices that may be connected to the real-time interface room 412.

The identity management system 420 can be an information system and/or a set of technologies that can be used for identity management. The identity management system 420 can employ any identity security framework that can work to authenticate and authorize users to access resources, such as the RTS application 210, farming data (e.g., both real-time and historical farming data), the server device 400, and other components and/or data associated with the system 100.

The communications component 430 can include one or more components and features for communicating across one or more networks, such as the network(s) 120. The communication component 430 can be configured to communicate via any number of network(s) 120, described herein. For example, to communicate in the system 100 of FIG. 1, the server device 400 can use a cellular, Ethernet, or Wi-Fi connection through a router to access the Internet in order to communicate with the client device 200, the data collection device 300 and/or the data store 110.

Figure 5:
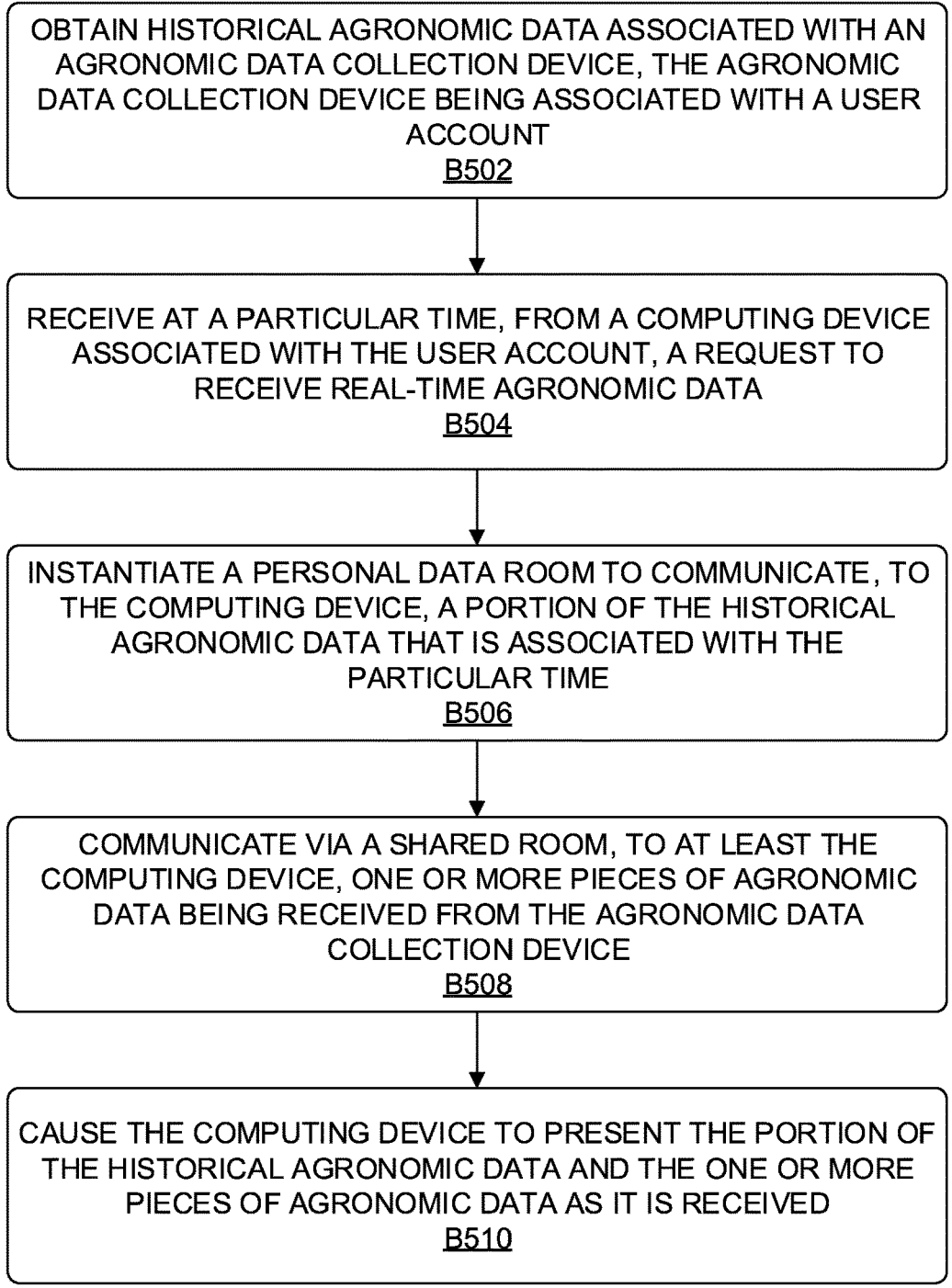
FIG. 5 is a flow diagram showing a method for presenting historical farming data and real-time farming data, in accordance with some embodiments of the present disclosure.

Now referring to FIG. 5, each block of method 500, described herein, comprises a computing process that may be performed using any combination of hardware, firmware, and/or software. For instance, various functions can be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 500 is described, by way of example, with respect to the system 100 of FIG. 1. However, this method may additionally or alternatively be executed by any one system, or any combination of systems, including, but not limited to, those described herein.

FIG. 5 is a flow diagram showing a method 500 for presenting historical farming data and real-time farming data, in accordance with some embodiments of the present disclosure. The method 500, at block B502, includes obtaining historical farming data associated with an farming data collection device, the farming data collection device being associated with a user account. For example, farming data generated by the data collection device can be stored in the system database in association with a data collection device that can be associated with a user account ID. A request for historical farming data can include a request for any farming data that was collected by a data collection device—and stored at a database—between a pair of timestamps.

The method 500, at block B504, includes receiving at a particular time, from a computing device associated with the user account, a request to receive real-time farming data. For example, two users may be interested in the performance of a piece of farming machinery and may request to view the real-time farming data associated with that piece of farming machinery simultaneously.

The method 500, at block B506, includes instantiating a personal data room to communicate, to the computing device, a portion of the historical farming data that is associated with the particular time. For example, the system can generate a request for all farming data between a pair of timestamps. The system can then generate and/or access a personal interface room to provide the data to the user via the personal interface room.

The method 500, at block B506, includes communicating via a shared room, to at least the computing device, one or more pieces of farming data being received from the farming data collection device. For example, two users may be interested in the performance of a piece of farming machinery and may request to view the real-time farming data associated with that piece of farming machinery simultaneously. Upon receiving the request from each of the users, the system can connect both users with a single real-time interface room (i.e., a shared interface room) corresponding to the single piece of farming machinery. The real-time interface room can then broadcast farming data received at the real-time interface room to each user and/or user application connected to the room.

The method 500, at block B508, includes causing the computing device to present the portion of the historical farming data and the one or more pieces of farming data as it is received. For example, the RTS application can cause display of a representation of real-time and historical farming data via a display of a client device.

Having described embodiments of the present disclosure, an exemplary operating environment in which embodiments of the present disclosure may be implemented is described below in order to provide a general context for various aspects of the present disclosure. Referring initially to FIG. 6 in particular, an exemplary operating environment for implementing embodiments of the present disclosure is shown and designated generally as computing device 600. Computing device 600 is but one example of a suitable computing environment and is not intended to suggest any limitation as to the scope of use or functionality of the described embodiments. Neither should the computing device 600 be interpreted as having any dependency or requirement relating to any one or combination of components illustrated.

The various embodiments may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The various embodiments may be practiced in a variety of system configurations, including hand-held devices, consumer electronics, general-purpose computers, more specialty computing devices, etc. The various embodiments may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present disclosure provide for, among other things, efficiently and effectively providing client devices access to real-time and historical farming data for processing or general consumption. The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that the described embodiments are one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter described in the present disclosure is provided with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
   obtaining historical farming data associated with a farming data collection device, the farming data collection device being associated with a user account;
   receiving at a particular time, from a computing device associated with the user account, a request to receive real-time farming data;
   instantiating a personal data room to communicate, to the computing device, a portion of the historical farming data that is associated with the particular time;
   communicating via a shared room, to at least the computing device, one or more pieces of farming data being received as a real-time data stream from the farming data collection device;
   determining that a data gap exists in the real-time data stream;
   causing a last observed piece of farming data to be carried forward in the real-time data stream, wherein the data gap is eliminated based on the last observed piece of farming data being carried forward; and
   causing the computing device to present the portion of the historical farming data and the one or more pieces of farming data as it is received.

2. The method of claim 1, wherein the one or more pieces of farming data is being received from the farming data collection device, and communicated to the computing device, as the portion of the historical farming data is being communicated to the computing device.

3. The method of claim 1, wherein the historical farming data associated with the farming data collection device is cleaned based on a set of user-defined adjustment values.

4. The method of claim 1, wherein the one or more pieces of farming data is raw data collected via the farming data collection device.

5. The method of claim 1, further comprising:
   communicating, to at least the computing device, a notification that the one or more pieces of farming data is being sent to the shared room; and causing the computing device to receive the one or more pieces of farming data via the shared room.

6. The method of claim 1, further comprising applying one or more user-defined adjustment values to the one or more pieces of farming data in the real-time data stream.

7. The method of claim 1, further comprising generating a query to retrieve the historical farming data based on a pair of timestamps, wherein a first timestamp corresponds to a time of a current date when the farming data collection device began collecting data and a second timestamp corresponds to the particular time when the request is received for real-time farming data.

8. A non-transitory computer storage medium storing computer-useable instructions that, when used by one or more processors, cause the one or more processors to:
  obtain historical farming data associated with a farming data collection device, the farming data collection device being associated with a user account;
  receive at a particular time, from a computing device associated with the user account, a request to receive real-time farming data;
  instantiate a personal data room to communicate, to the computing device, a portion of the historical farming data that is associated with the particular time;
  communicate via a shared room, to at least the computing device, one or more pieces of farming data being received as a real-time data stream from the farming data collection device;
  determine that a data gap exists in the real-time data stream;
  cause a last observed piece of farming data to be carried forward in the real-time data stream, wherein the data gap is eliminated based on the last observed piece of farming data being carried forward; and
  cause the computing device to present the portion of the historical farming data and the one or more pieces of farming data as it is received.

9. The medium of claim 8, wherein the one or more pieces of farming data is received from the farming data collection device, and communicated to the computing device, as the portion of the historical farming data is communicated to the computing device.

10. The medium of claim 8, wherein the historical farming data associated with the farming data collection device is cleaned based on a set of user-defined adjustment values.

11. The medium of claim 8, wherein the one or more pieces of farming data is raw data collected via the farming data collection device.

12. The medium of claim 8, wherein the instructions further cause the one or more processors to:
  communicate, to at least the computing device, a notification that the one or more pieces of farming data is being sent to the shared room; and
  cause the computing device to receive the one or more pieces of farming data via the shared room.

13. The medium of claim 8, wherein the instructions further cause the one or more processors to generate a query to retrieve the historical farming data based on a pair of timestamps, wherein a first timestamp corresponds to a time of a current date when the farming data collection device began collecting data and a second timestamp corresponds to the particular time when the request is received for real-time farming data.

14. A system comprising:
  one or more hardware processors; and
  a machine-readable hardware storage device coupled with the one or more hardware processors, the machine-readable hardware storage device storing instructions that, when executed by the one or more hardware processors, cause the system to perform operations comprising:
  obtaining historical farming data associated with a farming data collection device, the farming data collection device being associated with a user account;
  receiving at a particular time, from a computing device associated with the user account, a request to receive real-time farming data;
  instantiating a personal data room to communicate, to the computing device, a portion of the historical farming data that is associated with the particular time;
  communicating via a shared room, to at least the computing device, one or more pieces of farming data being received as a real-time data stream from the farming data collection device;
  determining that a data gap exists in the real-time data stream;
  causing a last observed piece of farming data to be carried forward in the real-time data stream, wherein the data gap is eliminated based on the last observed piece of farming data being carried forward; and
  causing the computing device to present the portion of the historical farming data and the one or more pieces of farming data as it is received.

15. The system of claim 14, further comprising:
  communicating, to at least the computing device, a notification that the one or more pieces of farming data is being sent to the shared room; and
  causing the computing device to receive the one or more pieces of farming data via the shared room.

16. The system of claim 14, further comprising generating a query to retrieve the historical farming data based on a pair of timestamps, wherein a first timestamp corresponds to a time of a current date when the farming data collection device began collecting data and a second timestamp corresponds to the particular time when the request is received for the real-time farming data.

17. The system of claim 14, further comprising applying one or more user-defined adjustment values to the one or more pieces of farming data in the real-time data stream.

* * * * *